June 30, 1959     W. F. HADDEN     2,892,495
SAFETY GRILL FOR VEHICLE DOORS

Filed Dec. 31, 1956     2 Sheets-Sheet 1

INVENTOR.
William F. Hadden.
BY
ATTORNEYS.

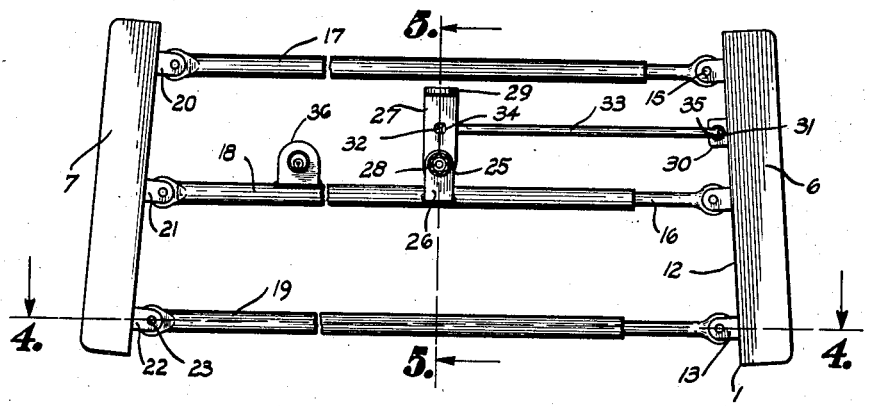

United States Patent Office 2,892,495
Patented June 30, 1959

2,892,495

SAFETY GRILL FOR VEHICLE DOORS

William F. Hadden, Kansas City, Kans.

Application December 31, 1956, Serial No. 631,921

1 Claim. (Cl. 160—216)

This invention relates to safety bars for window openings, and more particularly to a bar or grill having ends engaging against the side walls of the window openings of the rear of a "station wagon" or the like.

Usually a vehicle termed a "station wagon" has two swinging doors in the rear of the body. One swings downwardly from the floor and the other swings upwardly from the top. Usually the lower door is closed and quite often parents will occupy the front seat of the vehicle while the children are placed in the tonneau. Children are naturally active and if the upper door is opened to provide proper ventilation there is danger of the children falling through the door opening unless they are closely watched.

It is, therefore, the principal objects of the present invention to provide a grill for the upper window opening of the rear doors of a vehicle having a tonneau; to provide vertical bars or arms for engaging the sides of the window opening and having telescoping rods for adjustment of the grill to fit window openings of different size; to provide the vertical arms with pivotal mounting on the telescoping rods so as to fit the window openings where they taper inwardly or outwardly; and to provide a locking mechanism for the grill whereby when the vertical arms are pressed outwardly against the side of the window openings the telescoping members will be extended and the lock will hold the device firmly against the side walls of the window opening.

Other objects of the present invention are to provide a bar or grill which may be quickly installed and easily removed from the window opening of a station wagon and to provide a device of this character simple and economical to manufacture.

In accomplishing these and other objects of my invention, I have provided improved details of structure the preferred forms of which are illustrated in the accompanying drawings, wherein:

Fig. 3 is a front view of the bar or grill with the locking mechanism in detached or withdrawn position.

Fig. 4 is a cross-sectional view taken on a line 4—4, Fig. 3.

Fig. 5 is a cross-sectional view taken on a line 5—5, Fig. 3.

Fig. 6 is a fragmentary partly cross-sectional view illustrating the positive lock for the device.

Figure 1:
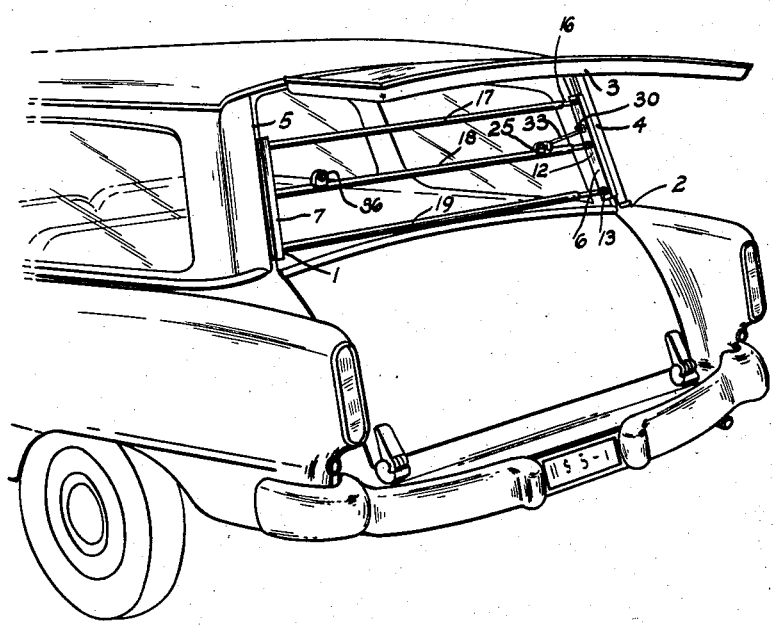
Fig. 1 is a perspective view of my invention shown attached to the window opening of the rear end of a station wagon.

Referring more in detail to the drawings:

1 designates a car grill embodying the features of my invention shown for attachment to an automobile 2 having an open rear window 3 with side frames 4 and 5. While I have here illustrated the grill attached to the rear window of a station wagon or the like it will be obvious that it may be adapted for side windows or other use.

The device consists of vertical side arms or standards 6 and 7 of channel-shaped formation providing grooves 8 and 9 in which are mounted by adhesive or other material channel-shaped resilient members 10 and 11, such as sponge rubber or the like. The back 12 of the standard 6 is provided with a plurality of spaced ears 13 and 14 between which are pivotally attached by pins 15 rods or the like 16, with their free ends telescoping in tubular members 17, 18 and 19. It will be obvious, of course, as many tubular members and rods may be utilized as desired.

The standard 7 is also provided with a plurality of spaced ears as indicated at 20, 21 and 22 (Fig. 3) to which are pivotally mounted by pins or the like as indicated at 23 the opposite ends of the tubular members 17, 18 and 19, the free ends of the tubes being flattened as illustrated in Fig. 4 and provided with openings 24 for the pins 23 so that the standard 7 is also pivotally mounted on the cross bars or tubular members.

The sponge rubber members 10 and 11 fit in the channels of the standards 6 and 7, and engage the inside edge of the sides of the windows 4 and 5 as illustrated in Fig. 1 and will engage there against without rattling and also will tend to adhere thereto by friction. The standards being pivotally mounted on the cross rods and tubular members will fit the side standards of the window should they be tapered either inwardly or outwardly. Most of the windows are tapered inwardly also as shown in Fig. 1 and the standards will adhere throughout the channel surface to the sides of the window.

In order to extend and lock the grill in place and hold the standards against the sides of the window, I provide a mechanism as indicated at 25 which comprises a bracket 26 welded or otherwise suitably secured to one side of the tubular member 18 near the open end thereof to which is pivotally mounted a lever arm 27 by bolts or the like 28. The lever arm is turned laterally forming a hand hold 29 for use by the operator. The side 12 of the standard 6 is provided with an outwardly extending lug 30 having an opening 31 and the lever arm 27 is provided near its center with an opening 32 and a rod 33 is connected to the lever arm by having its end turned laterally as indicated at 34 and the opposite end of the rod is turned laterally as indicated at 35 and engages in the opening 31 of the lug 30.

Figure 2:
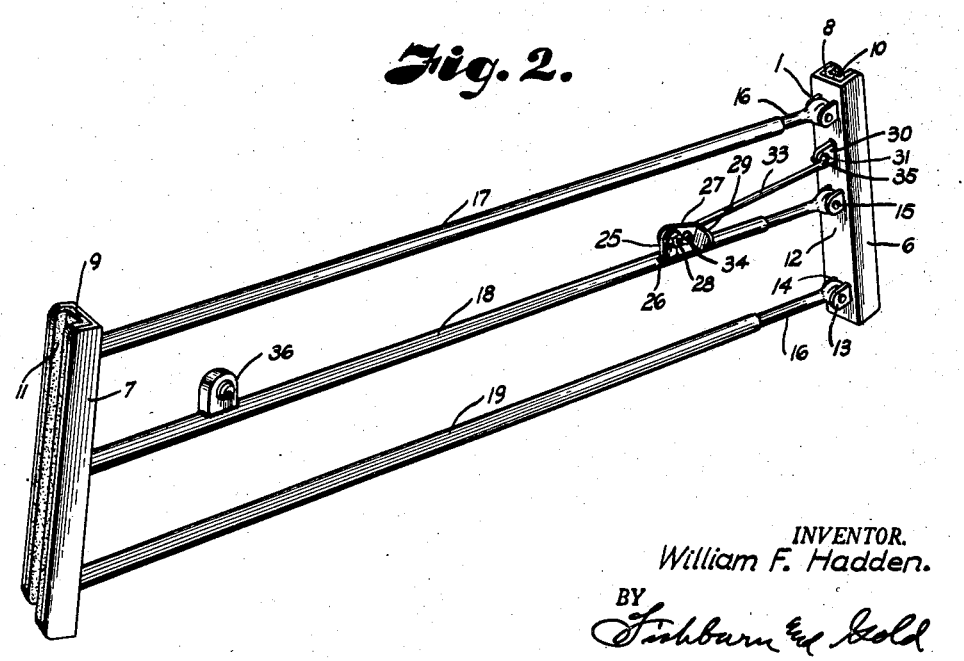
Fig. 2 is a perspective view of the bar or grill shown detached from the station wagon and particularly illustrating the pivotal mounting of the vertical side arms.

The operation of a device constructed and assembled as described is as follows:

With the grill or bar in the position as shown in Fig. 3 the rod 33 has moved the rods 16 inwardly in the tubes 17, 18 and 19 due to the connection of the rods with the standard 7 so as to disengage the standards 6 and 7 from the sides 4 and 5 of the window opening as shown in Fig. 1. When it is desired to insert the grill in the window opening it is placed therein and the lever arm 27 moved to the right as shown in Fig. 1 until the standards 6 and 7 securely engage the sides of the window 4 and 5. It will be obvious that the length of the arm 27 and rods 33 govern the distance of expansion of the grill and such adjustment will accommodate openings of different widths for different make cars. The arm is self-locking due to the fact that it moves past center as shown in Fig. 2 so that it will lie against the tubular member 18 and be held thereagainst because it is moved past center of its point of pivot and the children will unlikely be able to unlock the latching mechanism as there is considerable outward stress placed on the mechanism.

As an additional locking safety I provide a lock 36, such as an ordinary Yale lock which is welded to the tubular rod 18 and has a pin 37 adapted to be extended through an opening 38 in the rod 18 and engage in an opening 39 in the rod 16. The rod 16 is provided with a plurality of spaced openings such as the opening 39 as shown in Fig. 6 to provide for adjustment lengthwise of the grill and then locking the lock mechanism.

It will be obvious from the foregoing that I have provided an improved grill for window or door openings which may be quickly installed and detached as desired and one which will be rattle free and safe in operation.

What I claim and desire to secure by Letters Patent is:

An attachment for a rear window opening of the body of a vehicle having side frames comprising, vertically extending arms having outwardly facing channels and vertically spaced ears extending inwardly, channel shaped resilient members in the oppositely facing channels of said arms for engaging said side frames and for cushioning the contact between said arms and frames, said resilient members being of substantially the same length as the channel portions of said vertically extending arms, a plurality of tubular members having one end pivotally connected to the respective ears on one of said arms, a plurality of rods having one end pivotally connected to the respective ears on the other arm and having their free ends telescoping in the free ends of said tubular members, a bracket rigidly connected to one of said tubular members near the free end thereof, a lever pivotally connected to said bracket, said lever having an arm portion extending longitudinally of said tubular member and a transverse portion forming a handle, a lug rigidly mounted on one of said arms and extending inwardly toward said bracket, and a rod having one end pivotally connected to said lug and the other end pivotally connected to said arm portion of said lever whereby movement of said lever in one direction by use of the handle thereof will cause the vertical arms to move apart and engage said side frames and movement of said handle to move the lever past center will lock said lever in extended position and hold the vertically extending arms in contact with said side frames of the vehicle and movement of the handle in the other direction will allow the lever to move in the opposite direction to disengage the vertical arms from the side frames for removal of the attachment from the window.

References Cited in the file of this patent
UNITED STATES PATENTS

| | | |
|---|---|---|
| Re. 17,911 | Rexinger | Dec. 23, 1930 |
| 498,574 | Ryan | May 30, 1893 |
| 1,303,390 | Reed | May 13, 1919 |
| 1,942,707 | Jones | Jan. 9, 1934 |
| 2,449,326 | Schaefer | Sept. 14, 1948 |
| 2,490,612 | Ballard | Dec. 6, 1949 |
| 2,645,789 | Wisner | July 21, 1953 |
| 2,803,471 | Roth | Aug. 20, 1957 |

FOREIGN PATENTS

| | | |
|---|---|---|
| 903,374 | Germany | Feb. 4, 1954 |